(12) United States Patent
Roozeboom et al.

(10) Patent No.: US 11,763,693 B2
(45) Date of Patent: Sep. 19, 2023

(54) ARTIFICIAL INTELLIGENCE DRIVEN ASSESSMENT AND FEEDBACK TOOL

(71) Applicant: Myriad Sensors, Inc., Mountain View, CA (US)

(72) Inventors: Clifton Roozeboom, Mountain View, CA (US); David Bakker, San Jose, CA (US); Robert Douthitt, Mountain View, CA (US); John Bower, Leeds (GB); Corin Dubie, Nashville, TN (US)

(73) Assignee: Myriad Sensors, Inc., Mountain View, CA (US)

( * ) Notice: Subject to any disclaimer, the term of this patent is extended or adjusted under 35 U.S.C. 154(b) by 14 days.

(21) Appl. No.: 17/404,224

(22) Filed: Aug. 17, 2021

(65) Prior Publication Data

US 2023/0054427 A1    Feb. 23, 2023

(51) Int. Cl.
| | |
|---|---|
| *G06F 11/34* | (2006.01) |
| *G09B 7/02* | (2006.01) |
| *G06F 9/451* | (2018.01) |
| *G06N 20/00* | (2019.01) |

(52) U.S. Cl.
CPC ................ *G09B 7/02* (2013.01); *G06F 9/453* (2018.02); *G06F 11/3438* (2013.01); *G06N 20/00* (2019.01)

(58) Field of Classification Search
CPC ...................................................... G06F 17/18
See application file for complete search history.

(56) References Cited

U.S. PATENT DOCUMENTS

| | | | | |
|---|---|---|---|---|
| 2010/0198903 A1* | 8/2010 | Brady et al. | ............ | G06Q 50/20 709/201 |
| 2013/0117019 A1* | 5/2013 | Akopian et al. | ........ | G06Q 50/00 704/235 |
| 2020/0065681 A1* | 2/2020 | Wolf et al. | ................ | G06N 5/04 |
| 2021/0035464 A1* | 2/2021 | Otero et al. | ......... | G09B 23/181 |
| 2021/0333249 A1* | 10/2021 | Remes et al. | ...... | G01N 30/8641 |

\* cited by examiner

*Primary Examiner* — Di Xiao
(74) *Attorney, Agent, or Firm* — Patterson & Sheridan, LLP

(57) ABSTRACT

In some embodiments, a computer system comprises processors, a request manager coupled to the processors and configured to receive practice test requests, a practice test manager configured to retrieve practice test data, a real time session manager configured to establish a real time session with a user computer, an AI-based analyzer configured to execute a machine learning model to determine accuracy of results received from the user computer, a non-transitory computer-readable storage medium storing sequences of instructions for: receiving, using the request manager, a request for performing a practice test; retrieving, using the practice test manager, data for the practice test; using the real time session manager: establishing a real time session with the user computer to enable the user computer to access the data and execute the practice test; and as the practice test is executed, collecting test results and transmitting them to user devices.

20 Claims, 11 Drawing Sheets

ARTIFICIAL INTELLIGENCE DRIVEN ASSESSMENT AND FEEDBACK TOOL

FIELD OF THE DISCLOSURE

The present disclosure relates to computer-implemented tools configured to perform an artificial intelligence (AI) based assessment of progress in learning made by students, and to provide feedback determined based on the AI-based assessment. More specifically, the disclosure relates to computer-based tools that implement AI-based approaches to assess the progress made by the students in acumen and comprehension of science concepts.

BACKGROUND

These days, preparing the students for college, careers, and citizenship with strong science-based skills, such as critical thinking and inquiry-based problem solving, is vital. While some students are highly self-motivated to acquire strong skills, others may require some encouragement in that area. The studies show that the students with growth-focused mindsets report greater motivation to advance, set more ambitious learning goals for themselves, and are more likely to pursue and complete college degrees than other students.

Some of the factors that impact improvements in intrinsic motivation include the development of classroom formative assessment skills that are evaluated as the students perform laboratory experiments and that build competence and experience, which in turn stimulate creativity and interest in science.

Formative assessment refers to the ability to determine the students' understanding of the science-related subjects and using the determined information to further enhance the students' learning process. The determined information may include, for example, reports about the progress the students have made. The information may be provided to the teachers to keep them informed about the students' progress or lack thereof.

Laboratory experiences usually refer to providing hands-on experience supported by inquiry-based learning approaches. However, in many situations, implementing inquiry-based learning is often more difficult than implementing the traditional lectures or recipe-based experiments. This is because the open-ended labs designed to explain complex and in-depth concepts are difficult to implement. Implementing them is especially difficult in middle-schools because the middle-school level teachers often lack formal science training. Examples of the science concepts that are difficult to teach using the open-ended lab approach include analyzing and interpreting data and constructing explanations and designing solutions. One of the reasons for that is the lack of relevant formative and summative assessment tools. Indeed, there are currently no national or state-wide standardized tests that are well-designed and scientifically-vetted for this purpose.

Therefore, there is a need to develop and improve the students' learning assessment tools that would allow reducing traditional testing time and that would improve the manner in which the students learn science-related subjects.

SUMMARY

The appended claims may serve as a summary of the disclosure.

DETAILED DESCRIPTION

Figure 1:
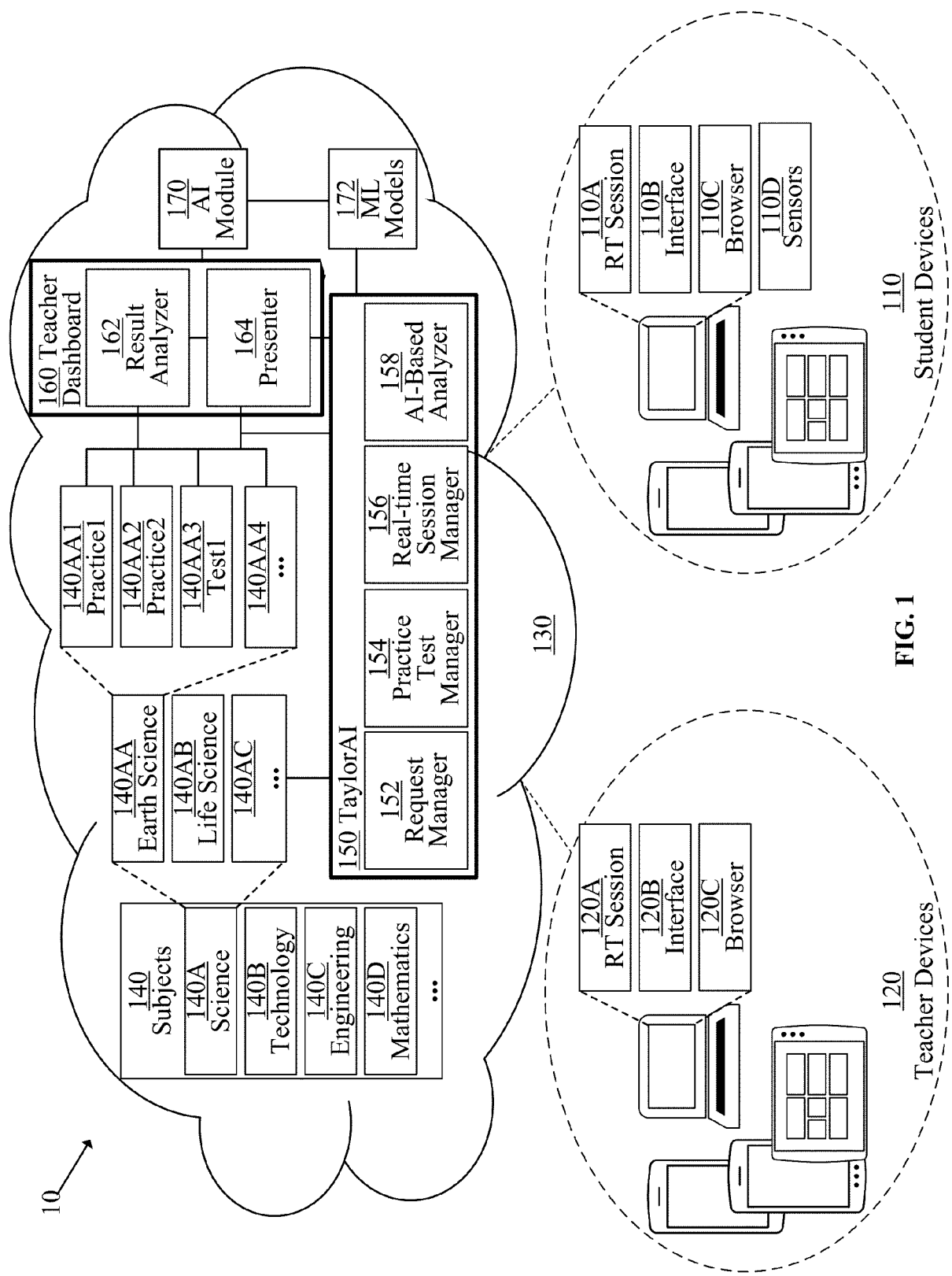
FIG. 1 is a block diagram showing an example computer environment implementing an artificial intelligence driven assessment and feedback tool.

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach. Embodiments are disclosed in sections according to the following outline:

1. GENERAL OVERVIEW
2. EXAMPLE COMPUTER ENVIRONMENTS
    2.1. EXAMPLE TAYLORAI TOOL
        2.1.1. DEPLOYING TAYLORAI AS A DATA ANALYSIS TOOL
        2.1.2. DEPLOYING TAYLORAI AS AN INVESTIGATION TOOL
    2.2. EXAMPLE TEACHER DASHBOARD
        2.2.1. DEPLOYING TEACHER DASHBOARD AS A MONITORING TOOL
        2.2.2. DEPLOYING TEACHER DASHBOARD AS A PRACTICE TOOL
    2.3 ARTIFICIAL INTELLIGENCE MODULES
    2.4. STUDENT DEVICES
    2.5. TEACHER DEVICES
    2.6. CLOUD SYSTEM
    2.7. ADDITIONAL TOOLS
3. EXAMPLE PRODUCT IMPLEMENTATIONS IN EDUCATIONAL SETTINGS
4. EXAMPLE PRODUCT IMPLEMENTATIONS FOR DATA ANALYSIS
5. EXAMPLE PRODUCT IMPLEMENTATIONS FOR PROVIDING INTERVENTIONS
6. EXAMPLE PRODUCT IMPLEMENTATIONS FOR PROVIDING DIRECTIONS
7. EXAMPLE PRODUCT IMPLEMENTATIONS FOR ACCESSING CORRECTNESS OF DATA

8. EXAMPLE DATA VISUALIZATION GENERATED USING A TEACHER DASHBOARD
  8.1. DASHBOARD DISPLAY
  8.2. INTENDED EDUCATIONAL OUTCOMES
9. EXAMPLE PROCESS FOR USING AI TO ASSESS PROGRESS AND PROVIDING FEEDBACK ON EXECUTION OF AN EXPERIMENT
10. EXAMPLE PROCESS FOR CONDUCTING A MULTIPLE-OBJECTS EXPERIMENT
11. IMPROVEMENTS PROVIDED BY CERTAIN EMBODIMENTS
12. IMPLEMENTATION MECHANISMS

1. General Overview

In some embodiments, an AI-based learning assessment platform that allows to improve the manner in which students learn science-related subjects and that allows to reduce the traditional testing time of science comprehension by the students is presented. The platform comprises an AI-driven assessment system and can be used in any existing classroom technology setting. The platform is designed to assist the students in learning science concepts, test the students' understanding of the concepts, pinpoint the subjects and/or concepts that may require additional attention from the students, and help the students in mastering even complex issues and science experiments. Furthermore, the platform allows improving communications between teachers and students, provides the teachers with the information indicating the progress made by the students, and ultimately leads to improving the students' ability to excel in learning the science-related concepts.

An AI-based learning assessment platform may be configured with several tools. Examples of the tools include an AI-driven feedback system for students and a teacher dashboard for teachers. Other tools (described later) may also be implemented in the AI-based learning assessment platform. Depending on the implementation, the access to the tools may be managed by the assessment platform.

An AI-driven feedback tool is also called a TaylorAI tool (or TaylorAI). The TaylorAI tool may be used as an AI-based coach configured to aid the students as the students perform hands-on, science labs experiments. A teacher dashboard is an AI-driven formative assessment tool for teachers. The dashboard may be used to monitor the students' progress in learning the science concepts.

An AI-based learning assessment platform may include several components, including one or more processors; a request manager coupled to the one or more processors and configured to receive practice test requests; a practice test manager configured to retrieve and provide practice test data; a real time session manager configured to establish a real time session with a user computer; an artificial intelligence (AI) based analyzer configured to execute a machine learning model to determine accuracy of results received from the user computer; and a non-transitory computer-readable storage medium coupled to the one or more processors and storing one or more sequences of instructions.

The instructions, when executed by the one or more processors, may cause the one or more processors to perform: receiving, using the request manager, a request for performing a practice test; retrieving, using the practice test manager, data for the practice test; and, using the real time session manager, establishing a real time session with the user computer to enable the user computer to access the data and execute the practice test.

As the real time session is in progress and the practice test is executed, test results are received from the user computer and transmitted to one or more user devices.

In response to determining that the real time session has ended, the test results are analyzed, using the AI-based analyzer executing the machine learning model, to determine one or more quality metrics for the test results. The quality metrics are then transmitted to the one or more user devices.

Transmitting the quality metrics to the user devices may cause a user device, from the one or more user devices, to generate a graphical representation of the one or more quality metrics and display the graphical representation on a display device of the user device.

Displaying the graphical representation on the display device of the user device may include providing analytic functionalities for analyzing the one or more quality metrics and determining an acumen and comprehension level of a user who performed the practice test and that is determined based on the one or more quality metrics.

Furthermore, displaying the graphical representation on the display device of the user device may include generating a graphical user interface dashboard that graphically depicts the acumen and comprehension level of the user who performed the practice test.

The graphical user interface dashboard may display various objects, including icons, text boxes, graphs, data arrangements and/or tables capturing the one or more quality metrics.

As the real time session is in progress and the practice test is executed, a visual overlay to be displayed over a depiction of data of the practice test is generated using the practice test manager. The visual overlay may include prompts, graphs, and information that point out trends and relevant data points and may assist the students in executing the practice test.

Furthermore, as the real time session is in progress and the practice test is executed, sensor signals are collected from one or more sensors communicatively coupled to the user computer. The sensor signals may be included in the test results and transmitted, with the test results, to user devices.

In some embodiments, the learning assessment platform is further configured to receive, using the request manager, a plurality of requests for performing a plurality of practice tests. The platform may further retrieve, using the practice test manager, a plurality of data sets for the plurality of practice tests.

Using the real time session manager, the platform may establish a plurality of real time sessions with a plurality of user computers to enable the plurality of user computers to access corresponding data of the plurality of practice tests and execute a corresponding practice test from the plurality of practice tests from the plurality of user computers.

In some embodiments, the learning assessment platform is configured to perform the following for each particular real time session, of the plurality of real time sessions: as the particular real time session is in progress and the corresponding practice test is executed, collecting particular test results received from a particular user computer, and transmitting the particular test results to the one or more user devices.

Furthermore, for each particular real time session, of the plurality of real time sessions, the platform, in response to determining that the particular real time session has ended, analyzes the particular test results, using the AI-based analyzer executing the machine learning model, to determine one or more particular quality metrics for the particular test results, and transmits the one or more particular quality metrics to the one or more user devices.

Transmitting the particular quality metrics to the user devices may cause a particular user device, from the one or more user devices, to generate a particular graphical representation of the one or more particular quality metrics and display the particular graphical representation on a particular display device of the user device.

Displaying the particular graphical representation on the particular display device of the user device may include providing analytic functionalities for analyzing the one or more particular quality metrics.

Displaying the particular graphical representation on the particular display device of the user device may include generating a particular graphical user interface dashboard that graphically depicts the acumen and comprehension level of the user who performed the corresponding practice test.

The particular graphical user interface dashboard may display various objects, including icons, text boxes, graphs, data arrangements or tables capturing the one or more particular quality metrics.

In some embodiments, a computer-implemented method is configured to perform the steps described above.

In some embodiments, a non-transitory computer-readable storage medium stores one or more computer instructions which, when executed by one or more computer processors, cause the processors to perform the steps described above.

2. Example Computer Environments

FIG. 1 is a block diagram showing an example computer environment implementing an artificial intelligence driven assessment and feedback tool. FIG. 1, the other drawing figures, and all of the description and claims in this disclosure are intended to present, disclose, and claim technical systems and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

Configurations of computer environment platform 10 may vary and may depend on the implementations. In some embodiments, platform 10 comprises one or more student devices 110, one or more teacher devices 120, a cloud system 130, database 140 hosting one or more software applications and subject data 140/140AA-140AB/140AA1-140AA4, a TaylorAI tool 150, a teacher dashboard 160, an AI module 170 and one or more machine learning models 172. In other configurations, platform 10 may include some, but not all, components depicted in FIG. 1. In yet other configurations, platform 10 may include additional components that are not shown in FIG. 1.

In some embodiments, TaylorAI 150 is implemented as a module on top of cloud-based software, such as the PocketLab Notebook. The software may be configured to generate, for example, a student portal that enables the students to request and generate lab reports and perform a data analysis.

Teacher dashboard 160 may be implemented on top of the cloud-based software and the software may be configured to generate, for example, a teacher portal (or a dashboard) providing tools for monitoring the students' progress, providing teacher and student resources, science lesson resources, and statistical information about the progress that the students made.

The PocketLab Notebook can be used as a stand-alone tool or in conjunction with PocketLab sensors that may be configured to collect experimental data. The PocketLab sensors are small wireless devices that can measure properties like altitude, force, and temperature, and may be configured to transmit the collected data using the Bluetooth technology to devices such as smartphones, tablets, Chromebooks, and computers. Examples of those devices include student devices 110 and teacher devices 120, depicted in FIG. 1 and described later.

TaylorAI 150 and teacher dashboard 160 may be implemented as supplemental science products that educators may use with the science core curriculum to teach the students and to improve the lab experience for the students. The products are designed to provide, conduct, and monitor the activities that conform to the educational standards in both content and methodology. In some situations, they may be used to replace the traditional science equipment like temperature probes, force meters, and even typical paper lab notebooks.

2.1. Example TaylorAI Tool

In some embodiments, TaylorAI 150 is configured to analyze how closely the result data captured as a student conducts a science experiment matches a training dataset known to be correct. The tool may also be configured to identify common mistakes that the students typically make when performing the science experiments or taking science tests. Furthermore, the tool may be configured to provide guidance (and intervention) to help the students in avoiding making the mistakes and to recover from the mistakes. The tool may be also configured to test the students' understanding of the science concept by administering the tests with multiple choice questions. Some of the benefits provided by the TaylorAI tool include the ability to increase the students' understanding of the experiments and spark the students' interest in science.

TaylorAI 150 may include a request manager 152 configured to receive requests from students to conduct a science experiment, to request access to the experiment data, and the like.

TaylorAI 150 may also include a practice test manager 154 configured to conduct a science experiment, a science test, and the like.

Moreover, TaylorAI 150 may include a real-time (RT) session manager configured to establish an RT communications session between a student device (from a group of student devices 110 described later) and TaylorAI 150.

Furthermore, TaylorAI 150 may be configured with an AI-based analyzer 158. AI-based analyzer 158 may cooperate with an AI module 170 and machine learning models 172 and may be configured to monitor the progress in performing a science experiment, identifying mistakes made during the experiment, suggesting solutions for avoiding making the mistakes, and otherwise helping the students in learning and comprehending the science concepts and specific aspects of physics and the like.

2.1.1. Deploying TaylorAI As a Data Analysis Tool

In some embodiments, a TaylorAI tool is configured with the functionalities to provide visual hints and coaching for analyzing data gathered during a science experiment. The TaylorAI tool may provide hints pertaining to, for example, explaining the gathered data in fundamentally new ways that have never been implemented in a classroom before. For example, the tool may provide the functionalities to guide the students through difficult tasks of investigating the science experiments, distinguishing the relevant data from errors and noise introduced during the science experiments, and the like.

Furthermore, the TaylorAI tool may provide the functionalities that allow the students to pursue open-ended questions, evaluate data, develop explanations, engage in conversation about the experiments, and communicate students' conclusions within the predefined framework specific to the science experiments.

Moreover, the TaylorAI tool may be configured with the visualization functionalities for presenting, visualizing, and interpreting data gathered during the science-related simulation. The gathered data may be visualized in real-time and using robust plug-ins served from a learning assessment platform.

2.1.2. Deploying TaylorAI As an Investigation Tool

In some embodiments, a TaylorAI tool is configured with the functionalities to assist students in developing scientifically valid explanations of phenomena and results gathered during scientific experiments. The TaylorAI tool may provide a variety of data collection capabilities and data analysis methods that may expose the students to a wide variety of data collection and analysis approaches.

Moreover, the TaylorAI tool may provide creative solutions for addressing science-related problems and for forming answers to questions related to the science experiments. Some of the benefits provided by the TaylorAI tool include the ability to increase the students' proficiency in science, increase the students' problem solving skills, increase the level of understanding of the science concepts, all of which are necessary to develop the skills that are desirable in pursuing the science-related and engineering careers.

2.2. Example Teacher Dashboard

In some embodiments, a teacher dashboard is configured with the functionalities that allow teachers to monitor, analyze and summarize the progress that students are making when studying science-related subjects and performing science-related experiments. Furthermore, the dashboard may be configured with the functionalities allowing the teachers to monitor the student-tutoring interventions, and to provide insights into the students' and class-level trends determined based on the data collected as the students perform science tests.

2.2.1. Deploying Teacher Dashboard As Monitoring Tool

Functionalities implemented in a teacher dashboard may allow to increase the quantity and quality of hands-on lab activities. For example, if used by teachers in a science classroom, it may increase the students' ability to engage in the conducted experiments and engage the students with each other in performing the experiments.

It also allows the teachers to simultaneously monitor groups of students, not just individual students one-at-the time.

Furthermore, deploying the teacher dashboard allows the teachers to spend more time on more complex and higher-order activities such as data analysis and constructing explanations. It also allows the teachers to spend more time assisting the students who require more assistance in a more efficient and effective way.

2.2.2. Deploying Teacher Dashboard As a Practice Tool

Functionalities implemented in a teacher dashboard may allow the teachers to monitor the progress of science experiments performed by students. For example, the teacher dashboard may provide the functionalities that enable the teachers to facilitate authentic science and engineering practices in school classrooms more easily and with higher fidelity than the traditional lectures and practices allow. The teacher dashboard may, for example, allow selecting activities from a library of activities and provide built-in assessment capabilities.

The dashboard may also allow identifying the particular students who struggle with certain science concepts or experiments. Furthermore, the dashboard may allow providing informative feedback related to common misconceptions and misunderstanding of science-related concepts. Moreover, the dashboard may allow assessing the students' understanding of science topics based on the experiment data collected as the students perform science experiments.

The teacher dashboard may be configured with the functionalities that allow providing relevant interventions during the hands-on inquiry-based labs, and thus allow developing the deep understanding of the scientific related concepts and developing of scientific skills. Using the dashboard, the teachers may be able to facilitate authentic, science activities that are similar to those performed by scientists as the scientists conduct their research, while also being appropriate for the school-level students.

2.3. Artificial Intelligence Modules

In some embodiments, machine learning (ML) models and ML approaches are implemented to support the execution of an AI driven assessment and feedback tool presented herein. Example models may utilize convolutional neural network (CNN) based models and/or Constrained CNN based models. The Constrained CNN (CCNN) may be applicable to the analysis of data collected as a student is, for example, performing an experiment involving finding the force in a collision where the data is collected by a sensor implemented in an accelerometer. The predefined limits on the reading of the accelerometer and the limits set forth on the experiment may be used to constrain the CCNN.

Referring again to FIG. 1, environment platform 10 comprises AI module 170 and one or more ML models 172. In some embodiments, AI module 170 employs a CNN and/or a CCNN that uses the constraints from the a priori collected information to classify student-collected data with respect to training datasets gathered by a teacher or researcher. One or more ML models 172 may be implemented to support the CNN and/or CCNN.

Training of the algorithms focuses on determining what inputs and information needs to be entered and used to train the AI network. The training may be performed using a process of data labeling, which can be manually done by human experts. In some situations, the training data may be prepared and processed by researchers. Alternatively, the training data may be prepared and processed by teacher experts and may allow expanding the number of human perspectives with regard to the training of the AI network.

During the training process, an expert may analyze a sample of graphs, known as a training set, and classify them based on their correctness and accuracy. The classification may include not just a class labelled as "good" and a class labelled as "bad." The classes may also include the classes labelled as "common problems with the experimental setup," and the like.

Once the training is completed, the results of the training may be validated and the validation data may provide insights on, for example, the correctness of the ongoing lab reports generated by the students.

In some embodiments, AI module 170 is configured to analyze a match graph activity representing the activities in which students measured their physical location using, for example, a rangefinder and moved forward and backward to investigate concepts on the relationship between position and velocity. Other exploratory experimentation on the data used to confirm the study feasibility may be used to classify many types of graphs into meaningful categories. For example, an experiment involving a physical collision of a cart with an object may have a very specific graphic signature, and early tests show that the algorithms implemented herein can automatically classify the students' graphs into categories based on how well the students carried out the experiment.

In some embodiments, AI module 170 may generate one or more ML models 172 that are trained on input features which can be determined in advance of the deployment of assessment platform 10. For instance, AI module 170 may receive previous data pertaining to the physics experiments and a set of experiment results deemed to be correct and use that data as the input to train the models.

One or more ML models 172 may be regression models such as generalized additive models (GAM), tree-based models, and/or neural network models. The models may be configured to estimate the results of the experiments, determine statistical information about the students' performance of the experiments, and estimate the likelihood that a student, or a group of students, may require some help or intervention before they can successfully complete the experiments.

AI module 170 may also use alternative methods of quantifying uncertainty, such as Monte Carlo sampling. As an example, a four parameter distribution approach may be used to implement the AI-based assessment and feedback tool presented herein.

2.4. Student Devices

AI-based assessment and feedback platform 10 depicted in FIG. 1 may be utilized in schooling and teaching different science-related subjects at various levels. It is, however, primarily designed with the focus on the middle-school students and teachers teaching physical science.

Referring again to FIG. 1, in some embodiments, computer environment 10 comprises one or more student devices 110. Student devices 110 may include various user devices, such as laptops, smartphones, PDAs, tablets, PCs, workstations, and the like.

Student devices 110 may be configured to execute software applications that allow downloading applications and data from cloud system 130. For example, student devices 110 may be configured to download experiment applications, experiment data, experiment results, statistical information about the experiments, experiment parameters, and the like, from system 130.

Upon downloading one or more experiment applications and data for an experiment, from cloud system 130, student devices 110 may execute the experiment applications, and send instructions directly to practice test manager 154 to initiate the experiment.

Once an experiment is completed (or is in progress), the results of the experiment may be transmitted, by for example wireless transceiver, to AI-based analyzer 158. Furthermore, or alternatively, the results of the experiment may be communicated to one or more teacher devices 120. Moreover, the results of the experiment may be transmitted to cloud system 130 for storing.

2.5. Teacher Devices

Referring again to FIG. 1, in some embodiments, computer environment 10 comprises one or more teacher devices 120. Teacher devices 120 may include various user devices such as laptops, smartphones, PDAs, tablets, PCs, workstations, and the like.

Teacher devices 120 may be configured to execute software applications that allow downloading applications and data from cloud system 130. For example, teacher devices 120 may be configured to download experiment applications, experiment data, experiment results, statistical information about the experiments, experiment parameters, and the like, from cloud system 130.

Upon downloading one or more experiment applications and data for an experiment, from cloud system 130, teacher devices 120 may execute the experiment applications, collect information about the progress made by students in conducting the experiments, and generate statistical reports and dashboard data.

In some embodiments, teacher devices 120 may initiate an experiment on their own. Alternatively, teacher devices 120 may send instructions to initiate an experiment to one or more student devices 110.

Once an experiment is completed (or is in progress), the results of the experiment may be transmitted, by wireless transceivers, directly to teacher devices 120 or to teacher dashboard. Furthermore, or alternatively, the results of the experiment may be communicated to one or more student devices 110. Moreover, the results of the experiment may be transmitted to cloud system 130 for storing.

2.6. Cloud Storage System

Referring to FIG. 1, cloud system 130, may be configured to store and serve experiment applications and experiment data for conducting and monitoring physics experiments and to execute AI-based assessment and feedback tools 150/160. Cloud system 130 may be implemented in a standalone server, a distributed server system, in a cloud system, and the like.

Cloud system 130 may be configured to store data used by AI-based assessment and feedback tools 150/160. The non-limiting examples of data may include a subject database 140, and subject data 140AA-140AB/140AA1-140AA4. Arrangements of subject database 140 may vary and may depend on the implementations. The examples depicted in FIG. 1 should not be viewed as limiting in any way.

In the depicted example, subject database 140 may include data related to various subjects, including science data 140A, technology data 140B, engineering data 140C, mathematics 140D, and the like.

Each of the subjects shown in subject database 140 may have one or more sub-subjects and the corresponding additional database for storing additional data for the sub-subjects. The examples of the sub-subjects and the corresponding additional databases shown in FIG. 1 should not be viewed as limiting in any way. In FIG. 1, the sub-subjects, and additional databases for science 140A include, for example, earth science data 140AA, life science data 140AB, and other data 140AC.

Each of the sub-subject shown in subject database 140 may have one or more sub-sub-subjects and the corresponding additional database for storing additional data for the sub-subjects. In FIG. 1, the sub-sub-subjects, and additional databases for Earth science 140AA include, for example, a practice #1 140AA1, a practice #2 140AA2, a practice test #1 140AA3, a practice test #2 140AA4, and the like.

Cloud system 130 may be configured to store results, statistical data, and parameters for a variety of applications, including software applications configured to define scientific experiments, software applications for conducting scientific experiments, software applications for collecting data as scientific experiments are conducted, and the like. For example, cloud system 130 may be configured to store experiment initialization parameters for an experiment, experiment results provided once the experiments were completed and stopped, statistical information about the experiments, statistical information about the users who participated in the experiments, ratings of the experiments, grades given to the user who participated in the experiments, and the like.

Information for storing in cloud system 130 may be communicated from TaylorAI 150, teacher dashboard 160, student devices 110, and/or teacher devices 120 to cloud system 130 wirelessly or using any type of communications connection. Similarly, information already stored on cloud system 130 may be wirelessly communicated from cloud system 130 to TaylorAI 150, teacher dashboard 160, student devices 110, and/or teacher devices 120 using any type of communications connection.

2.7. Additional Tools

In some embodiments, a learning assessment platform provides additional tools for providing hands-on middle-school science-related activities and data training sets to cover a range of science subjects. The platform may also provide mechanisms for iterating the AI-based data analysis algorithm to provide relevant feedback on a wide range of experimental data collected as the students perform science experiments. Furthermore, the platform may provide tools for testing and analyzing the student's construction of explanations for the results of the science experiments.

Deployment of assessment platform 10 may include enabling communications connections between student devices 110, teacher devices 120, TaylorAI tool 150, teacher dashboard 160 and other components of cloud system 130. For example, the student and teacher devices, such as computers, PCs, laptops, tables, and the like would have to be configured to establish the Internet connections with each other. The students and teachers would also have to have access to lesson materials and other auxiliary materials, all of which may be served from cloud system 130.

3. Example Product Implementation in Educational Settings

Figure 2A:
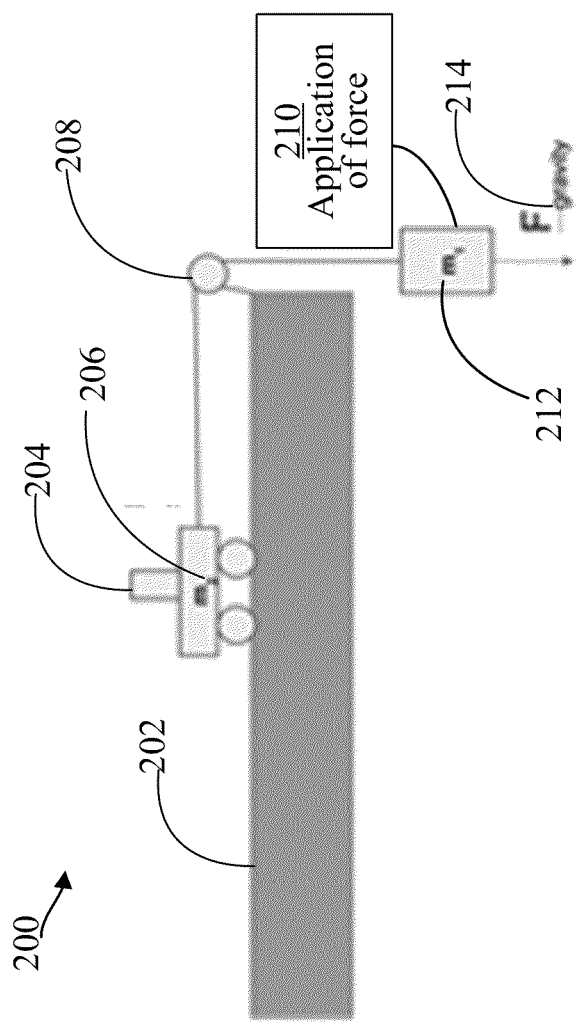
FIG. 2A is a block diagram showing an example product implementation in an educational setting.

FIG. 2A is a block diagram showing an example product implementation in an educational setting. In the depicted example, a measuring acceleration cart kit 202, which may be communicatively coupled to AI-driven assessment and feedback platform 10 shown in FIG. 1, is used to help students and teachers to conduct a physics science lesson. Cart kit 202 may include a track 202, a physical miniature car/ track 204, a sensor 206 built-in in car 204, a pulley-system 208, and an object 212 used as a weight-adding object.

Car 204 may house one or more wireless transceivers configured to transmit sensor data from sensor 206 to platform 10. Cart kit 202 may provide a power supply to car 204 and to sensor 206 and other components of cart kit 202.

One of the purposes of the experiment depicted in FIG. 2A is to observe that, as mass is added to object 212, force 214 increases, and car 204 accelerates along track 202. Measuring acceleration cart 202 is configured to measure the acceleration of car 204 along track 202, and, using sensor 206, to communicate the information about the acceleration, the mass, and the like to teacher dashboard 160 and/or TaylorAI 150.

The experiment depicted in FIG. 2A is designed to allow the students to investigate how increasing the force applied to car 204 affects the car acceleration ($F = ma$). The experiment is typically part of the middle-school science curriculum - NGSS DCI PS2. The applicable rule states that the motion of an object is determined by the sum of the forces acting upon it; if the total force on the object is nonzero, then its motion changes.

To allow the students to perform the experiment, a teacher usually assigns the Lab Report lesson to the students in the class either as an individual work assignment or an assignment to be performed by groups of students. As the students work on the Lab Report, the teacher may access teacher dashboard 160 (shown in FIG. 1) to monitor the students' progress. If, based on the information displayed in the dashboard, the teacher determines that some students have difficulties in performing or completing the experiment, then the teacher may provide some assistance to the students, help them when necessary, and the like.

4. Example Product Implementation for Data Analysis

Figure 2B:
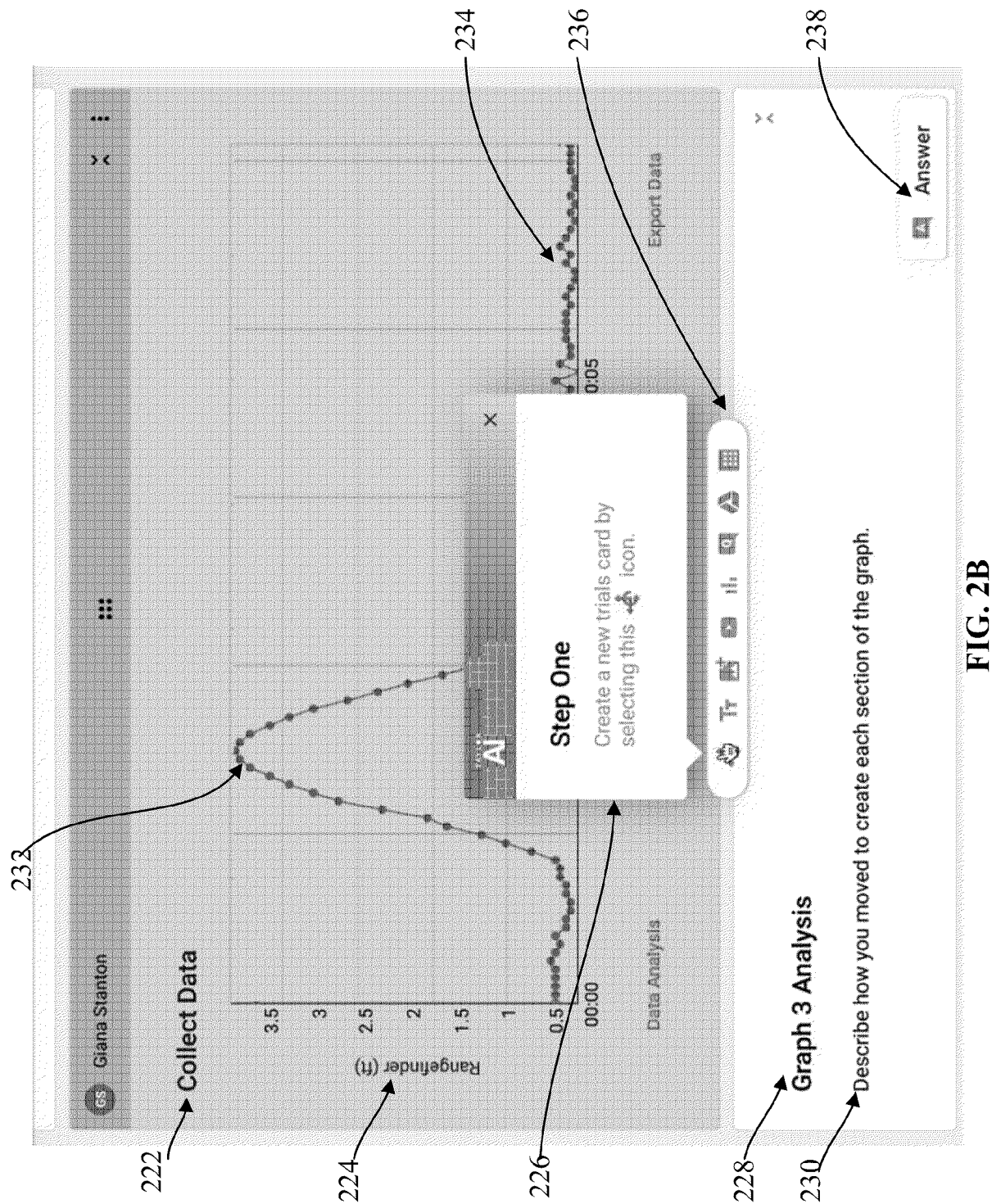
FIG. 2B is a block diagram showing an example product implementation for data analysis.

FIG. 2B is a block diagram showing an example product implementation for data analysis. Suppose that students are conducting an experiment, and as the experiment is in progress, the students make notes, collect data, perform data analysis, and the like.

In the background of those activities, TaylorAI 150 (shown in FIG. 1) may provide real-time individualized feedback to the students to help them make progress through the data collection and analysis portions of the lab. For example, TaylorAI 150 may be configured to assess correctness of the students' inputs, determine the students' proficiency in analyzing the data, identify gaps in the students' skills related to conducting and completing the experiment.

In the example depicted in FIG. 2B, a student accessed a TaylorAI Student Interface, and a web browser executed on the student device displayed a webpage 222 titled "collect data." In this particular example, it appears that the student collected sensor data 232-234 and the AI analysis is incorrect.

The displayed graph is a two-dimensional graph having a vertical axis 224 representing a rangefinder expressed in feet, and a horizontal axis for representing a distance driven by car 204 (shown in FIG. 2A). AI-based analyzer 158 of TaylorAI 150 (shown in FIG. 1), may display a prompt 226, labelled as "step one," which provides instructions for creating a new trial card by selecting a particular icon. Examples of the icons may be shown in tab 236.

In the lower portion of webpage 222, AI-based analyzer 158 may cause displaying a title 228 indicating that this is a Graph 3 Analysis, or the like. Analyzer 158 may also cause displaying a hint 230 indicating "describe how you moved to create each section of the graph." The answer to the posed question may be available to the student if the student selects, for example, an interactive button 238, labelled with the word "Answer."

5. Example Product Implementations for Providing Interventions

Suppose that students are conducting an experiment, and as the experiment is in progress, the students make notes, collect data, perform data analysis, and the like. Suppose, however, that the collected data is incorrect, as shown in FIG. 2B. TaylorAI 150 may be configured to provide interventions (e.g., some guidance) to the students.

Figure 2C:
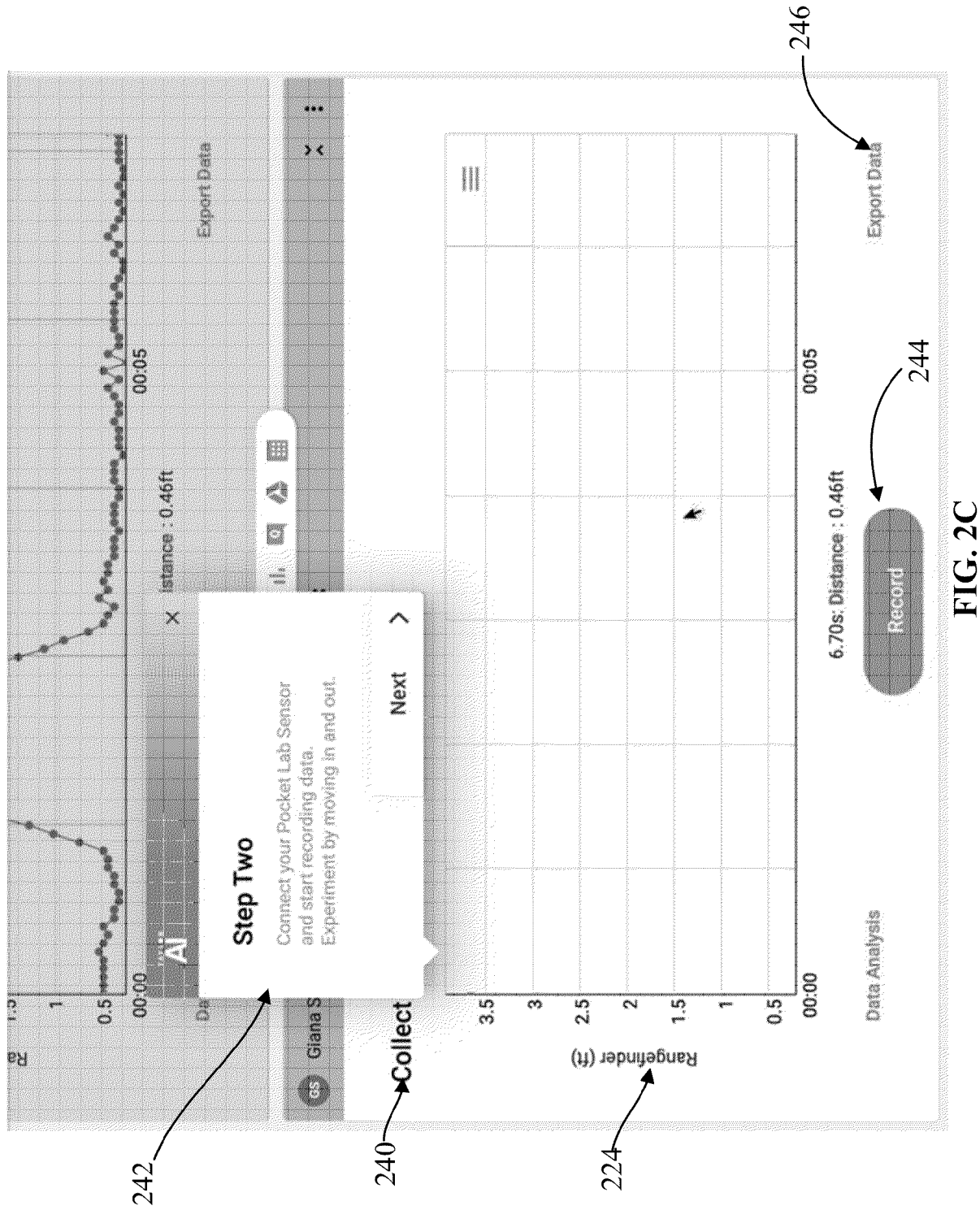
FIG. 2C is a block diagram showing an example product implementation for providing interventions.

FIG. 2C is a block diagram showing an example product implementation for providing interventions. In the example depicted in FIG. 2C, a student accessed a TaylorAI Student Interface, and a web browser executed on the student device displayed a webpage 240 titled "collect data." The displayed graph is a two-dimensional graph having a vertical axis 224 representing a rangefinder expressed in feet, and a horizontal axis for representing a distance driven by car 204 (shown in FIG. 2A). AI-based analyzer 158 of TaylorAI 150 (shown in FIG. 1), may display a prompt 242, labelled as "step two," which provides suggestions to the student to connect his sensor and start recording data, and to experiment by moving car 204. AI-based analyzer 158 may also provide an interactive button 244, labelled with the word "record," to allow the student to record the data as the student performs the experiment. AI-based analyzer 158 may also provide an interactive button 246, labelled with the word "export data," to allow the student to export the recorded data.

6. Example Product Implementations for Providing Directions

Suppose that students are conducting an experiment, and as the experiment is in progress, the students make notes, collect data, perform data analysis, and the like. Suppose, however, that the collected data is incorrect, as shown in FIG. 2B. Furthermore, suppose that TaylorAI 150 was executed and caused providing interventions (e.g., some guidance) to the students, but the additional instructions and directions are needed. TaylorAI 150 may be configured to provide additional directions to the students.

Figure 2D:
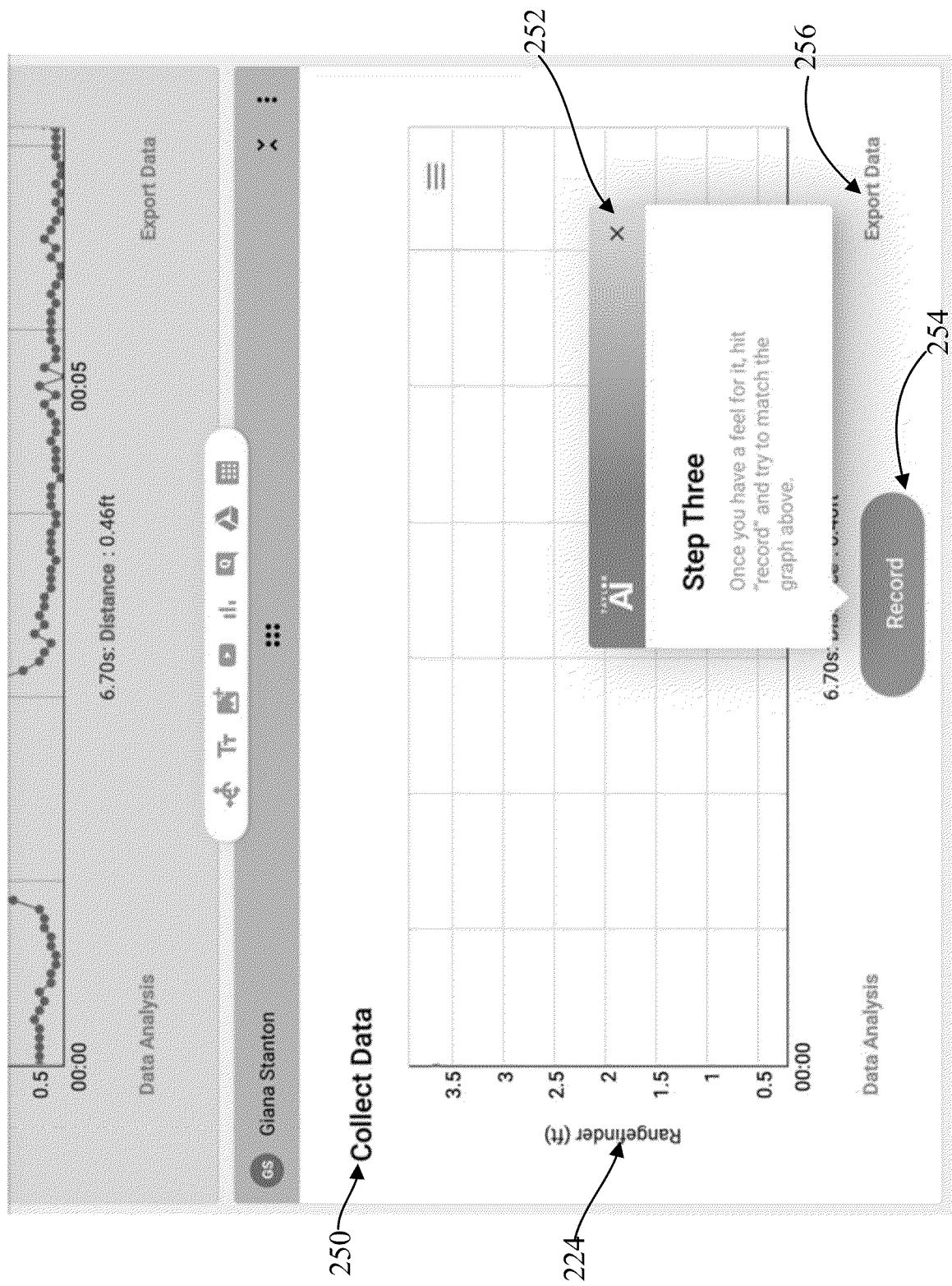
FIG. 2D is a block diagram showing an example product implementation for providing directions.

FIG. 2D is a block diagram showing an example product implementation for providing directions. In the example depicted in FIG. 2D, a student accessed a TaylorAI Student Interface, and a web browser executed on the student device displayed a webpage 250 titled "collect data." The displayed graph is a two-dimensional graph having a vertical axis 224 representing a rangefinder expressed in feet, and a horizontal axis for representing a distance driven by car 204 (shown in FIG. 2A). AI-based analyzer 158 of TaylorAI 150 (shown in FIG. 1), may display a prompt 252, labelled as "step three," which provides additional directions and suggestions to the student. The additional directions suggest that "once you have a feel for it, hit the 'record' button and try to match the graph above. AI-based analyzer 158 may provide an interactive button 254, labelled with the word "record," to allow the student to record the data as the student performs the experiment. AI-based analyzer 158 may also provide an interactive button 256, labelled with the word "export data," to allow the student to export the recorded data.

7. Example Product Implementations for Assessing Correctness of Data

Suppose that students are conducting an experiment, and as the experiment is in progress, the students make notes, collect data, perform data analysis, and the like. Suppose, however, that the collected data is incorrect, as shown in FIG. 2B. Furthermore, suppose that TaylorAI 150 provided interventions (e.g., some guidance) to the students, but it appeared that some additional instructions and directions were needed. Moreover, suppose that TaylorAI 150 provided additional directions to the students. TaylorAI 150 may be configured to assess the correctness of the data collected after the students repeated the experiment according to the instructions and hints.

Figure 2E:
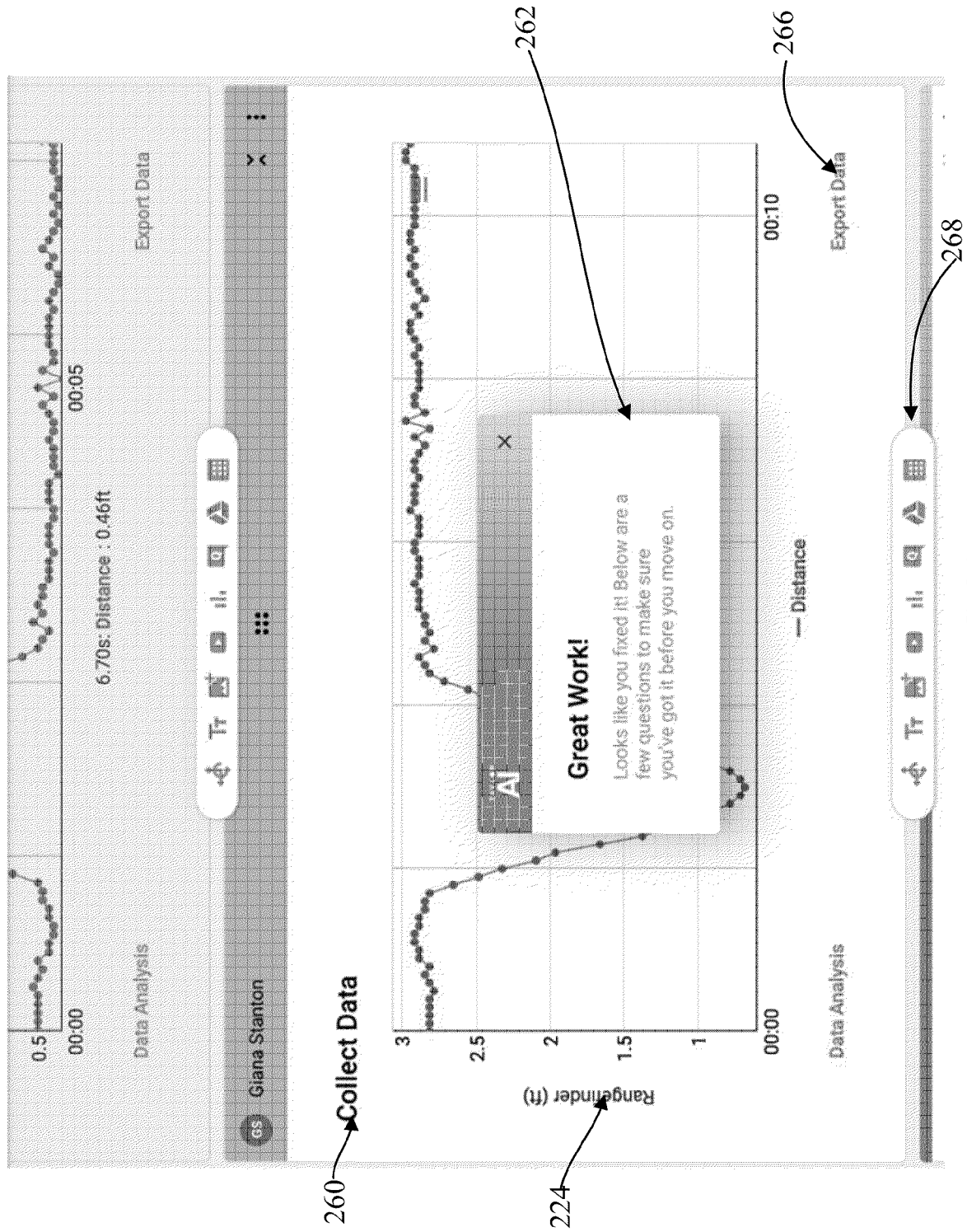
FIG. 2E is a block diagram showing an example product implementation for accessing correctness of data.

FIG. 2E is a block diagram showing an example product implementation for assessing correctness of data. In the example depicted in FIG. 2E, a student accessed a TaylorAI Student Interface, and a web browser executed on the student device displayed a webpage 260 titled "collect data." The displayed graph is a two-dimensional graph having a vertical axis 224 representing a rangefinder expressed in feet, and a horizontal axis for representing a distance driven by car 204 (shown in FIG. 2A). Suppose that the student repeated the experiment and AI-based analyzer 158 of TaylorAI 150 (shown in FIG. 1) analyzed the data collected this time and determined that the collected data is correct. In this situation, AI-based analyzer 158 of TaylorAI 150 may display a prompt 262, labelled as "great work" to indicate that the student fixed the problems that caused some issues before.

In some embodiments, AI-based analyzer 158 of TaylorAI 150 may also provide the functionality to present additional questions to the student and invite the student to answer those questions before he moves on to the next experiment. To allow the student to access the questions, AI-based analyzer 158 may provide an interactive tab 268 to allow the student to access the questions and to provide the answer. AI-based analyzer 158 may also provide an interactive button 266, labelled with the word "export data," to allow the student to export the recorded data.

8. Example Data Visualization Generated Using a Teacher Dashboard

8.2. Dashboard Display

Figure 2F:
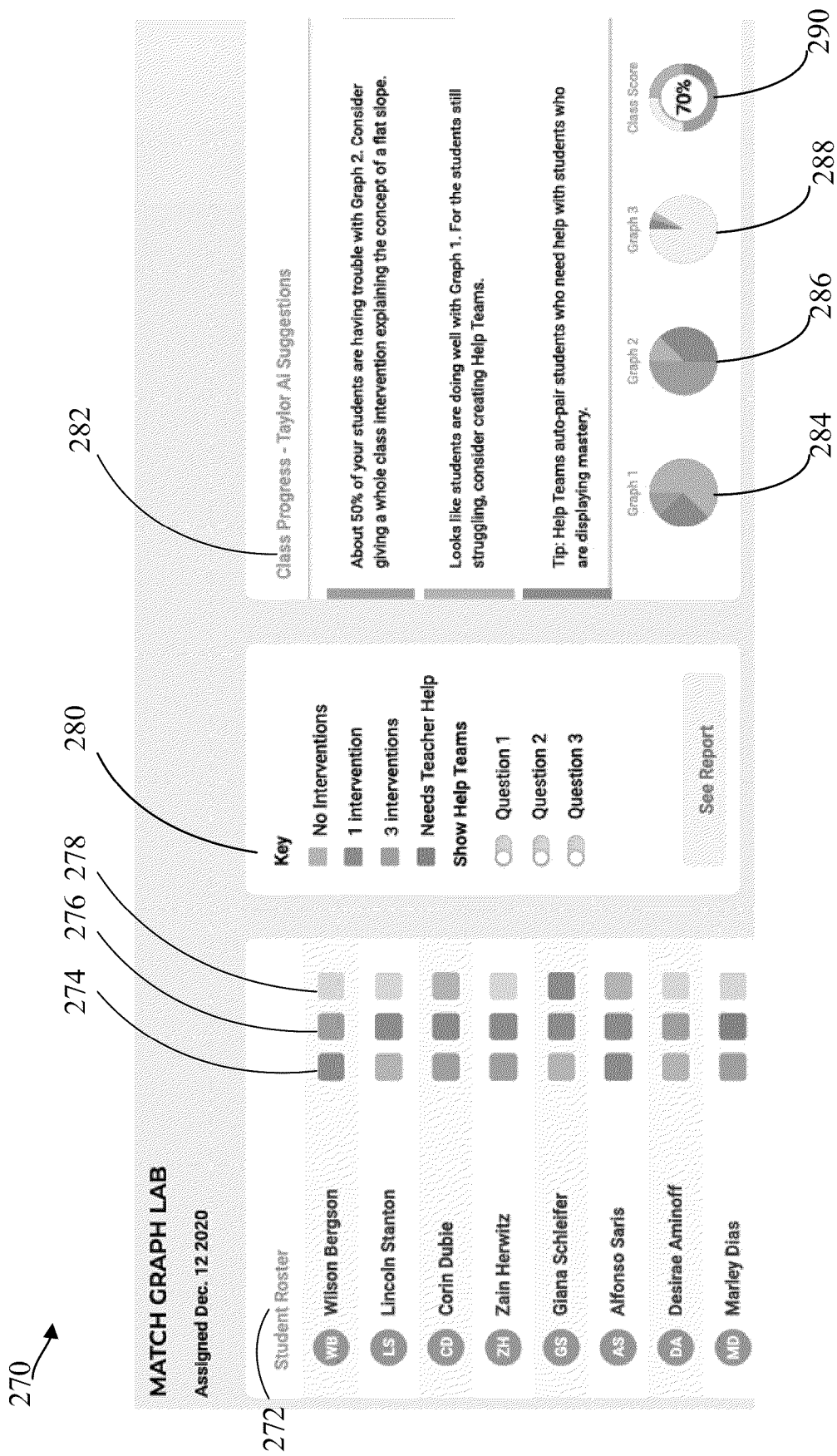
FIG. 2F is a block diagram showing an example data visualization generated by a teacher dashboard.

FIG. 2F is a block diagram showing an example data visualization generated by a teacher dashboard. The depicted example shows a graphical representation of progress that students made while performing science experiments.

In some embodiments, teacher dashboard 160 (in cooperation with TaylorAI 150) is configured to generate and cause displaying instant reports and graphical representations of the students' proficiency in performing science-related experiments and comprehending science concepts. The generated displays may include suggestions for interventions provided through, for example, teacher dashboard 160, described in FIG. 1. Providing the suggestions and actionable interventions in real time allows assisting the students as they perform the experiments and without the teacher one-on-one interactions. Typically, if the suggestions and interventions provided to the students via TaylorAI 150 (as described in FIGS. 2B-2E) fail to increase the students' proficiency in understanding the science concepts, the teacher may offer personal assistance to the laboring students.

In the example depicted in FIG. 2F, teacher dashboard 160 generated a graphical representation of the progress indicators identified for a group of students. The graphical representation may include an interactive dashboard 270 that includes, for example, a student roster 272, and for each student in roster 272 provide, for example, color coded indicators 274, 276, 278, and the like. The color coded indicators may depict different observations about the progress that the individual students made. In the example shown in FIG. 2F, keys 280 describe the following color coded indicators: (1) no intervention was needed for the student to complete the experiment, (2) one intervention was needed for the student to complete the experiment, (3) three interventions were needed for the student to complete the experiment, and (4) the student required the teachers' assistance.

In some embodiments, dashboard 270 may also display information 282 about the progress that the group of students as a class made. The information may be color coded and may include the suggestions for improving the progress that the students could make in the future.

In the example shown in FIG. 2F, information 282 may indicate that about 50% of the students in the class had trouble with Graph 2, and the suggestion indicated considering giving a whole class some intervention when explaining the concept of a flat slope. Other hints and tips may also be provided.

The tips and hints may be generated by, for example, result analyzer 163 of teacher dashboard 160 in cooperation with AI module 170 and machine learning models 172, described in FIG. 1. The tips and hints are meant to help in increasing the students' proficiency in comprehending the science concepts, to stimulate the students' progress, to engage the students in the deeper understanding of the concepts, and to encourage them to investigate the concepts on their own. That in turn would allow the teachers to focus on those students who might need additional assistance or one-on-one intervention.

In the example shown in FIG. 2F, the depicted information shows the teacher a summary of understanding of the science experiment and some problems that the students in the class encountered when performing the experiment. The information is presented in a form of a detailed view for each individual student including the interventions that the students received, and in a form of comprehensive summary for the class as a whole.

Using the information depicted in FIG. 2F, the teachers may be able to track the student's progress per each subject, per each sub-subject, per each experiment, per each test, and the like.

After each of the students completes and turns in a Lab Report, TaylorAI 150 may be executed to generate a post-lab assessment of the students' skills demonstrated during the performance of the experiments and track the proficiency of those skills for each student. The teachers may be able to use teacher dashboard 160 to assess the proficiency level for each student for each subject and sub-subject. As the students have more opportunities to demonstrate their proficiency of the skills, teacher dashboard 160 with the updated data. Based on the displayed information pertaining to the proficiency, TaylorAI 150 may determine a list of students who may require some additional guidance and interventions and suggest examples of the skills and concepts that the certain students might need to study further.

8.2. Intended Educational Outcomes

Generally, an AI-driven assessment and feedback tool presenter herein is intended to increase the student's proficiency and comprehension of science-related subjects and concepts. The tool is further intended to increase the quantity and quality of time that teachers spend with the students who may require additional guidance and intervention to help those students who may require such help.

The intended outcomes of the higher proficiency of science subjects may be observed as the students perform the hands-on experiments and tests in laboratories. The outcomes are usually determined through the support provided directly to students and the alerts sent to the teachers regarding the students so that the teachers may offer those students additional guidance and instructions.

The teachers may receive from teacher dashboard 160, information identifying the students that may need some extra help. The teachers may also receive formative feedback on commonly occurring misconceptions, and overall summary of class trends.

Figure 3:
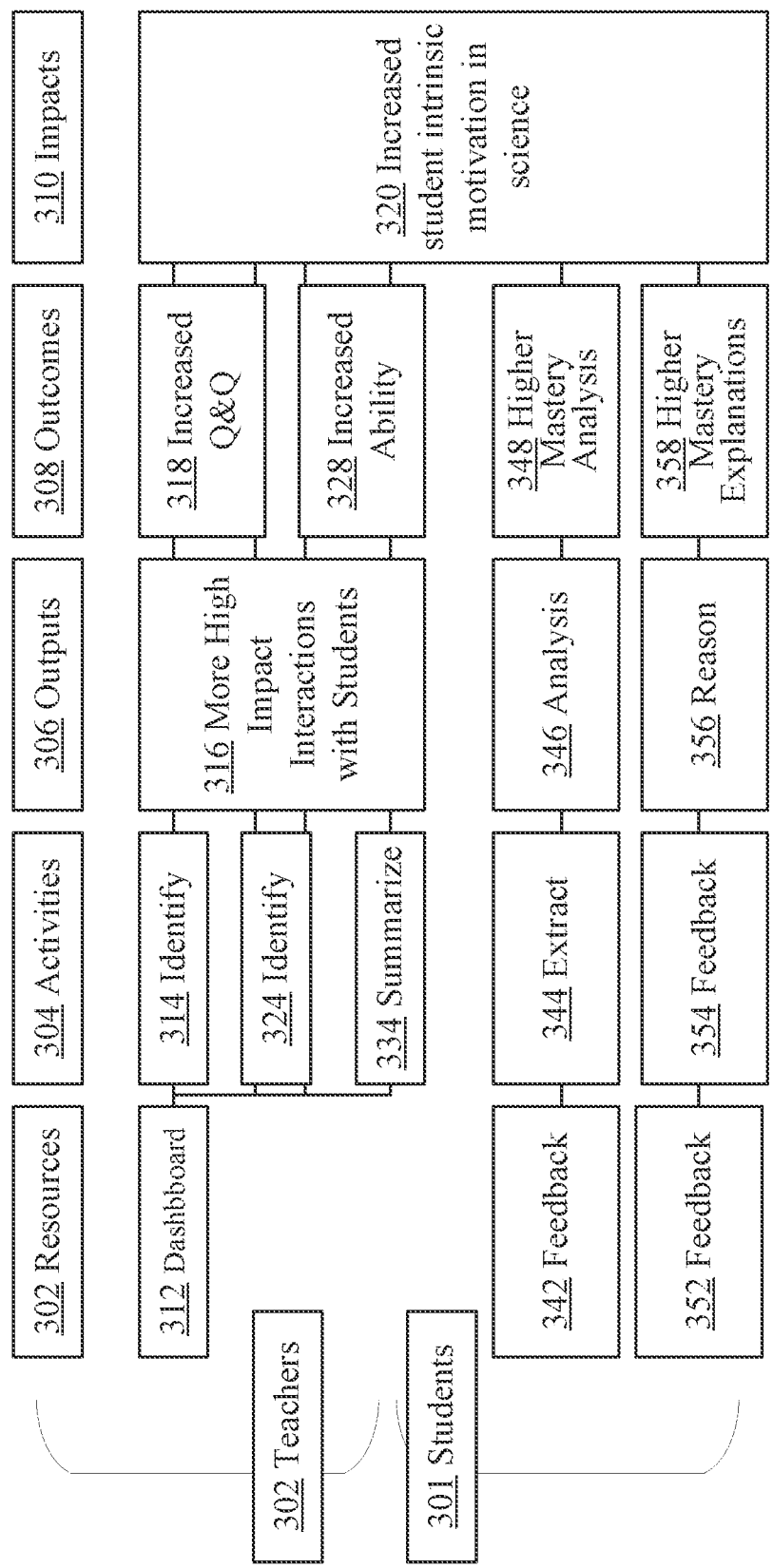
FIG. 3 is a block diagram showing example outcomes provided by an assessment platform.

FIG. 3 is a block diagram showing example outcomes provided by assessment platform 10. In the depicted example, resources 302 may include a formative feedback dashboard 312, a data analysis formative feedback 342, and a natural language text analysis formative feedback 352. Activities 304 may include identifying 314 students who need help, identifying 324 common misconceptions, summarizing 334 class trends, extracting 344 trends or cause/effect from raw experimental data, and providing feedback 354 on the explanation of the cause/effect, physical laws, or property at work. Outputs 306 may include high impact interactions 316 with students, an accurate data analysis 346, and an accurate and high scored claim, evidence, and reasons 356. Outcomes 308 may include an increased quantity and quality 318 of time with struggling students, an increased ability 328 to facilitate active engagement in science subjects, a higher mastery 348 of data analysis and interpretation, and a higher mastery 358 of specific subjects and constructions explanations. Impact 310 of the above may cause an increased student intrinsic motivation 320 in science subjects.

From the teachers' perspective, teachers 302 may use dashboard resources 312 to identify (314-324) students who need help, and common misconceptions and to summarize (334) the class trends. This may be used to generate more high impact interactions 316 with the students, to lead to the increased quantity and quality of time with the struggling students 318 and the increased ability to facilitate active engagement in the science topics 328.

From the students' perspective, students 301 may use data analysis formative feedback 342 and natural language text analysis formative feedback 352 to extract (344) trends or cause/effects from raw experimental data and derive feedback (354) on the explanation of the cause/effect, physical laws, or property at work. This may be used to perform accurate data analysis 346 and accurate and high scored claim, evidence, and reason 356. That in turn may lead to higher mastery (348) of specific subjects and data analysis and interpretation and higher master (358) of specific concepts and constructing explanations.

Figure 4:
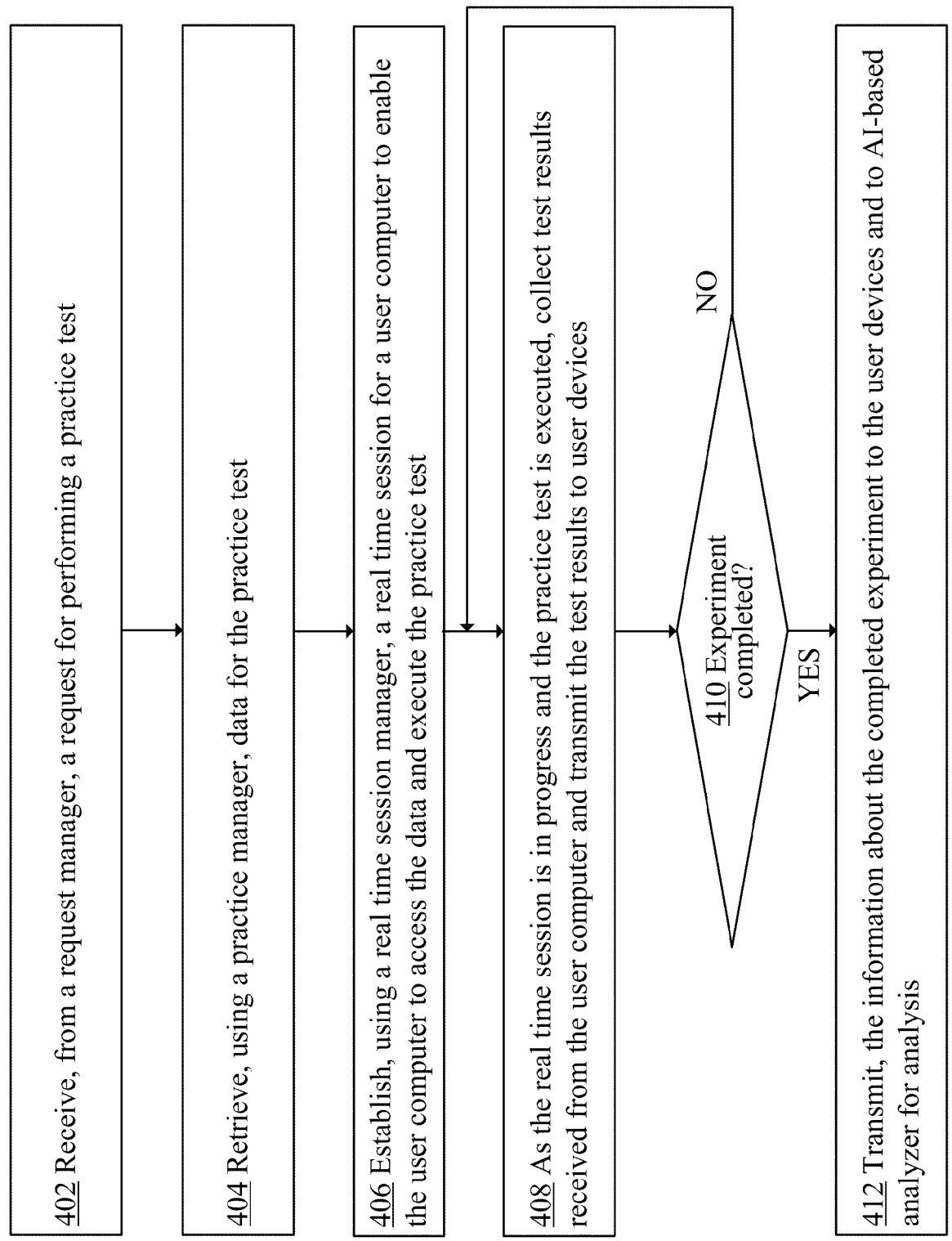
FIG. 4 is a flow diagram showing an example process of generating artificial intelligence driven assessment and feedback for an individual experiment.

9. Example Process for Using AI to Assess Progress and Providing Feedback on Execution of an Experiment FIG. 4 is a flow diagram showing an example process of generating artificial intelligence driven assessment and feedback for an individual experiment. The example process depicted in FIG. 4 may be executed by an AI driven assessment and feedback platform, an example of which is depicted in FIG. 1.

In step 402, an AI-based platform receives, from a request manager, a request for performing a practice test. In step 404, the platform retrieves, using a practice test manager, data for the practice test. In step 406, the platform establishes, using a real time session manager, a real time session with a user computer to enable the user computer to access the data and execute the practice test.

In step 408, as the real time session is in progress and the practice test is executed, the platform collects test results received from the user computer and transmits the test results to one or more user devices.

In step 410, the platform tests whether the experiment has been completed. If it has, then the platform proceeds to perform step 412. Otherwise, the platform proceeds to perform step 408.

In step 412, the platform transmits the information about the completed experiment to the user devices. Furthermore, the information may be transmitted to an AI-based analyzer for analysis.

Also in this step, in response to determining that the real time session has ended, the platform analyzes the test results, using an AI-based analyzer executing a machine learning model, to determine one or more quality metrics for the test results. transmitting the one or more quality metrics to the one or more user devices. Transmitting the one or more quality metrics to the one or more user devices may cause a user device, from the one or more user devices, to generate a graphical representation of the one or more quality metrics and display the graphical representation on a display device of the user device. Displaying the graphical representation on the display device of the user device may include providing analytic functionalities for analyzing the one or more quality metrics and determining an acumen and comprehension level of a user who performed the practice test and that is determined based on the one or more quality metrics. The displaying the graphical representation on the display device of the user device may include generating a graphical user interface dashboard that graphically depicts the acumen and comprehension level of the user who performed the practice test. The graphical user interface dashboard usually displays one or more of: icons, text boxes, graphs, data arrangements or tables capturing the one or more quality metrics.

10. Example Process for Conducting a Multiple-Objects Experiment

Figure 5:
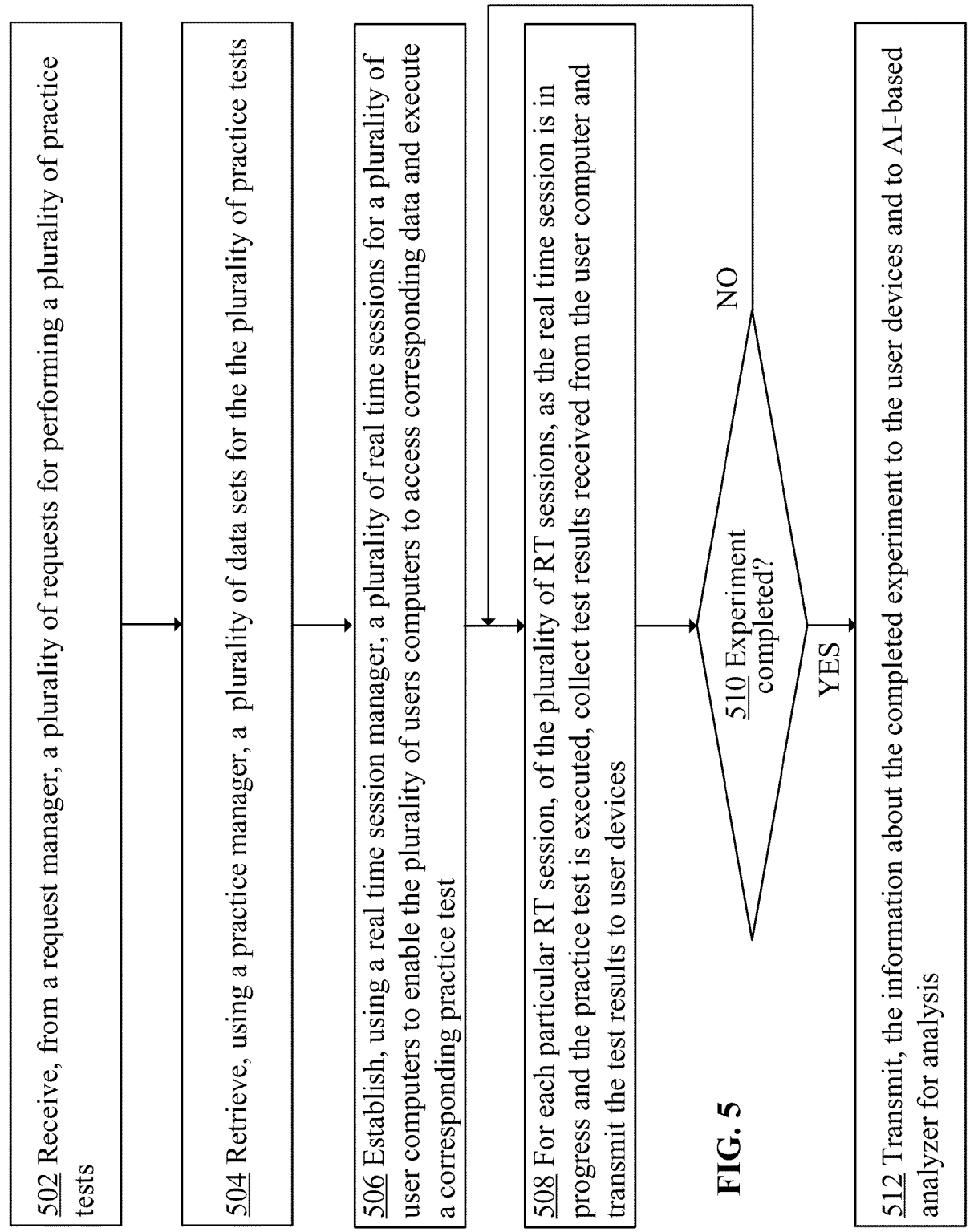
FIG. 5 is a flow diagram showing an example process of generating artificial intelligence driven assessment and feedback for multiple experiments.

FIG. 5 is a flow diagram showing an example process of generating artificial intelligence driven assessment and feedback for multiple experiments. The example process depicted in FIG. 5 may be executed by an AI driven assessment and feedback platform, an example of which is depicted in FIG. 1.

Student devices 110 may be configured to execute software applications that allow downloading applications, experiment data, experiment results, statistical information about the experiments, experiment parameters, and the like, from cloud system 130.

Teacher devices 120 may be configured to execute software applications and to download the applications and data from storage 150. Teacher devices 120 may be configured to, for example, download experiment applications, experiment data, experiment results, statistical information about the experiments, experiment parameters, and the like, from cloud system 130. Upon downloading one or more experiment applications and data from cloud system 130, teacher devices 120 may execute the experiment applications, and send instructions to initiate the experiment, or cause student devices 110 to execute the experiment applications to conduct the corresponding experiments.

In step 502, an AI-based platform receives, from a request manager, a plurality of requests for performing a plurality of practice tests. In step 504, the platform retrieves, using a practice test manager, a plurality of data sets for the plurality of practice tests.

In step 506, the platform establishes, using a real time session manager, a plurality of real time sessions with a plurality of user computers to enable the plurality of user computers to access corresponding data of the plurality of practice tests and execute a corresponding practice test from the plurality of practice tests from the plurality of user computers.

In step 508, for each particular real time session, of the plurality of real time sessions, as the particular real time session is in progress and the corresponding practice test is executed, the platform collects particular test results received from a particular user computer. Also in this step, the platform transmits the particular test results to the one or more user devices.

In step 510, the platform tests whether the experiment has been completed. If it has, then the platform proceeds to perform step 512. Otherwise, the platform proceeds to perform step 508.

In step 512, for each particular real time session, of the plurality of real time sessions, in response to determining that the particular real time session has ended, the platform transmits the results to user devices and to an AI-based analyzer. The particular test results are analyzed, using the AI-based analyzer executing the machine learning model, to determine one or more particular quality metrics for the particular test results.

Also in this step, in response to determining that the real time session has ended, the platform analyzes the test results, using an AI-based analyzer executing a machine learning model, to determine one or more quality metrics for the test results. transmitting the one or more quality metrics to the one or more user devices. Transmitting the one or more quality metrics to the one or more user devices may cause a user device, from the one or more user devices, to generate a graphical representation of the one or more quality metrics and display the graphical representation on a display device of the user device. Displaying the graphical representation on the display device of the user device may include providing analytic functionalities for analyzing the one or more quality metrics and determining an acumen and comprehension level of a user who performed the practice test and that is determined based on the one or more quality metrics. The displaying the graphical representation on the display device of the user device may include generating a graphical user interface dashboard that graphically depicts the acumen and comprehension level of the user who performed the practice test. The graphical user interface dashboard usually displays one or more of: icons, text boxes, graphs, data arrangements or tables capturing the one or more quality metrics.

11. Improvements Provided by Certain Embodiments

In some embodiments, a present AI-based assessment and feedback platform provides many benefits to students and teachers. The platform comprises an AI-driven assessment system and can be used in any existing classroom technology settings. The platform is designed to assist the students in learning science concepts, test the students' understanding of the concepts, pinpoint the subjects and/or concepts that may require additional attention from the students, and help the students in mastering even complex issues and science experiments. Furthermore, the platform allows improving communications between teachers and students, provides the teachers with the information indicating the progress made by the students, and ultimately leads to improving the students' ability to excel in learning the science-related concepts.

12. Implementation Mechanisms

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
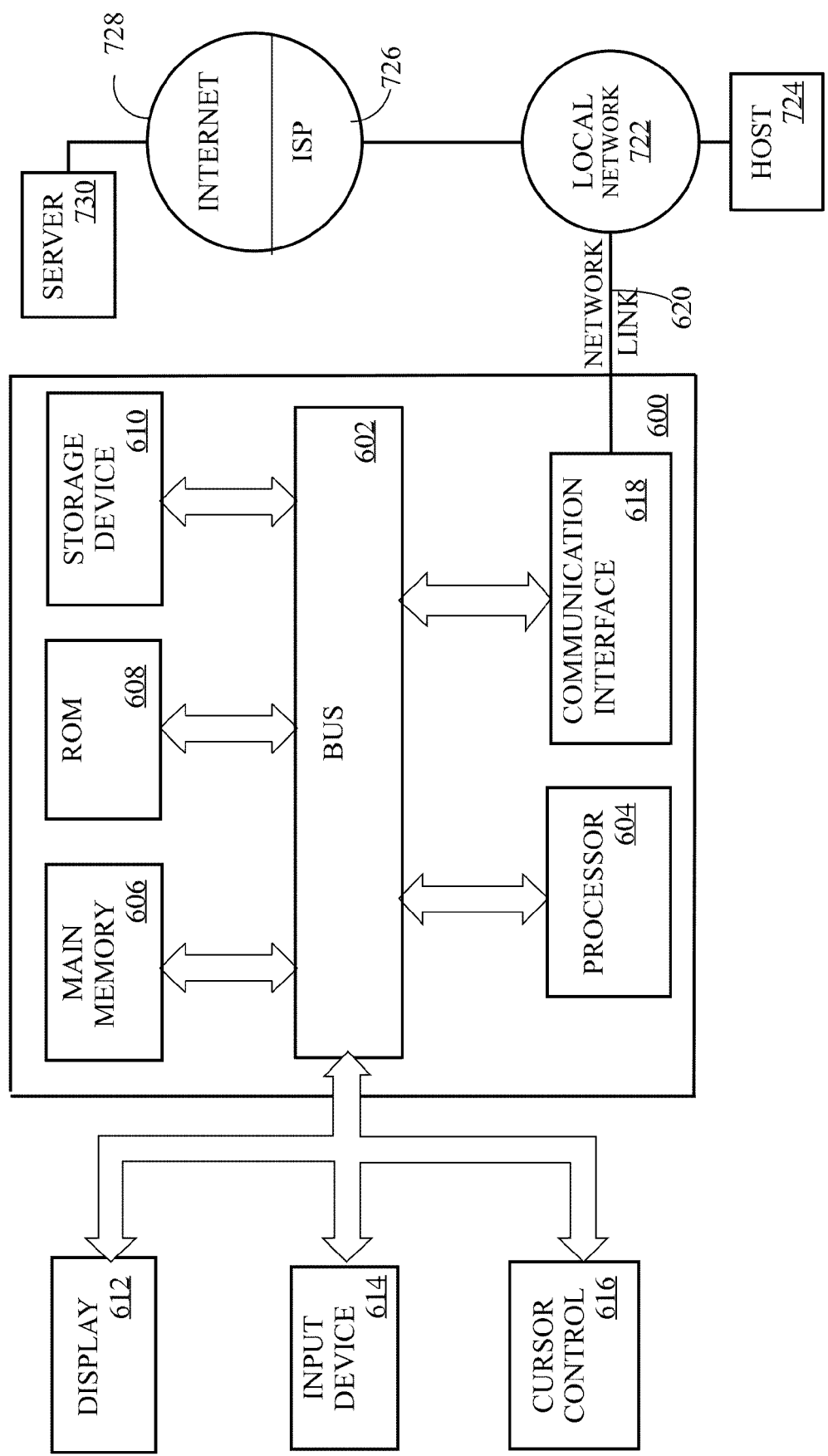
FIG. 6 is a block diagram of a computer system on which embodiments of the approach may be implemented.

FIG. 6 is a block diagram that depicts an example computer system 600 upon which embodiments may be implemented. Computer system 600 includes a bus 602 or other communication mechanism for communicating information, and a processor 604 coupled with bus 602 for processing information. Computer system 600 also includes a main memory 606, such as a random-access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. Although bus 602 is illustrated as a single bus, bus 602 may comprise one or more buses. For example, bus 602 may include without limitation a control bus by which processor 604 controls other devices within computer system 600, an address bus by which processor 604 specifies memory locations of instructions for execution, or any other type of bus for transferring data or signals between components of computer system 600.

An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input-device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic or computer software which, in combination with the computer system, causes or programs computer system 600 to be a special-purpose machine. According to one embodiment, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 600, various computer-readable media are involved, for example, in providing instructions to processor 604 for execution. Such a medium may take many forms, including but not limited to, non-volatile media and volatile media. Non-volatile media includes, for example, optical or magnetic disks, such as storage device 610. Volatile media includes dynamic memory, such as main memory 606. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip, or memory cartridge, or any other medium from which a computer can read.

Various forms of computer-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated service digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic, or optical signals that carry digital data streams.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution.

In the foregoing specification, embodiments have been described with reference to numerous specific details that may vary from implementation to implementation. Thus, the sole and exclusive indicator of what is, and is intended by the applicants to be, the approach is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer system comprising:
   one or more processors;
   a request manager coupled to the one or more processors and configured to receive practice test requests;
   a practice test manager configured to retrieve and provide practice test data;
   a real time session manager configured to establish a real time session with a user computer;
   an artificial intelligence (AI) based analyzer configured to execute a machine learning model to determine accuracy of results received from the user computer;
   wherein the one or more processors are configured to perform:
   receiving, using the request manager, a request for performing a practice test;
   retrieving, using the practice test manager, data for the practice test;
   using the real time session manager:
      establishing a real time session with the user computer to enable the user computer to access the data and execute the practice test; and
      as the real time session is in progress and the practice test is executed, collecting test results received from the user computer;
   in response to determining that the real time session has ended:
      analyzing the test results, using the AI-based analyzer executing the machine learning model, to determine one or more quality metrics for the test results;
      transmitting the one or more quality metrics for the test results to one or more user devices to cause the one or more user devices to display the one or more quality metrics.

2. The computer system of claim 1, wherein the one or more processors are further configured to perform:
   wherein transmitting the one or more quality metrics to the one or more user devices causes a user device, from the one or more user devices, to generate a graphical representation of the one or more quality metrics and display the graphical representation on a display device of the user device.

3. The computer system of claim 2, wherein displaying the graphical representation on the display device of the user device comprises providing analytic functionalities for analyzing the one or more quality metrics and determining an acumen and comprehension level of a user who performed the practice test and that is determined based on the one or more quality metrics;
   wherein displaying the graphical representation on the display device of the user device comprises generating a graphical user interface dashboard that graphically depicts the acumen and comprehension level of the user who performed the practice test;
   wherein the graphical user interface dashboard displays one or more of: icons, text boxes, graphs, data arrangements or tables capturing the one or more quality metrics.

4. The computer system of claim 3, wherein the one or more processors are further configured to perform:
   receiving, using the request manager, a plurality of requests for performing a plurality of practice tests;
   retrieving, using the practice test manager, a plurality of data sets for the plurality of practice tests;
   using the real time session manager:
      establishing a plurality of real time sessions with a plurality of user computers to enable the plurality of user computers to access corresponding data of the plurality of practice tests and execute a corresponding practice test from the plurality of practice tests from the plurality of user computers; and
      for each particular real time session, of the plurality of real time sessions:
         as the particular real time session is in progress and the corresponding practice test is executed, collecting particular test results received from a particular user computer;

transmitting the particular test results to the one or more user devices.

5. The computer system of claim 4, wherein the one or more processors are further configured to perform:

for each particular real time session, of the plurality of real time sessions:

in response to determining that the particular real time session has ended, analyzing the particular test results, using the AI-based analyzer executing the machine learning model, to determine one or more particular quality metrics for the particular test results;

transmitting the one or more particular quality metrics to the one or more user devices;

wherein transmitting the one or more particular quality metrics to the one or more user devices causes a particular user device, from the one or more user devices, to generate a particular graphical representation of the one or more particular quality metrics and display the particular graphical representation on a particular display device of the user device;

wherein displaying the particular graphical representation on the particular display device of the user device comprises providing analytic functionalities for analyzing the one or more particular quality metrics;

wherein displaying the particular graphical representation on the particular display device of the user device comprises generating a particular graphical user interface dashboard that graphically depicts the acumen and comprehension level of the user who performed the corresponding practice test;

wherein the particular graphical user interface dashboard displays one or more of: icons, text boxes, graphs, data arrangements or tables capturing the one or more particular quality metrics.

6. The computer system of claim 1, wherein the one or more processors are further configured to perform:

as the real time session is in progress and the practice test is executed, generating, using the practice test manager, a visual overlay to be displayed over a depiction of data of the practice test;

wherein the visual overlay comprises prompts, graphs, and information that point out trends and relevant data points, and that assist in executing the practice test.

7. The computer system of claim 1, wherein the one or more processors are further configured to perform:

as the real time session is in progress and the practice test is executed, collecting sensor signals from one or more sensors communicatively coupled to the user computer, and including the sensor signals in the test results.

8. A computer-implemented method comprising:

receiving, from a request manager, a request for performing a practice test;

retrieving, using a practice test manager, data for the practice test;

using a real time session manager:

establishing a real time session with a user computer to enable the user computer to access the data and execute the practice test; and as the real time session is in progress and the practice test is executed, collecting test results received from the user computer;

in response to determining that the real time session has ended:

analyzing the test results, using an AI-based analyzer executing a machine learning model, to determine one or more quality metrics for the test results;

transmitting the one or more quality metrics for the test results to one or more user devices to cause the one or more user devices to display the one or more quality metrics.

9. The computer-implemented method of claim 8, further comprising:

wherein transmitting the one or more quality metrics to the one or more user devices causes a user device, from the one or more user devices, to generate a graphical representation of the one or more quality metrics and display the graphical representation on a display device of the user device.

10. The computer-implemented method of claim 9, wherein displaying the graphical representation on the display device of the user device comprises providing analytic functionalities for analyzing the one or more quality metrics and determining an acumen and comprehension level of a user who performed the practice test and that is determined based on the one or more quality metrics;

wherein displaying the graphical representation on the display device of the user device comprises generating a graphical user interface dashboard that graphically depicts the acumen and comprehension level of the user who performed the practice test;

wherein the graphical user interface dashboard displays one or more of: icons, text boxes, graphs, data arrangements or tables capturing the one or more quality metrics.

11. The computer-implemented method of claim 10, further comprising:

receiving, using the request manager, a plurality of requests for performing a plurality of practice tests;

retrieving, using the practice test manager, a plurality of data sets for the plurality of practice tests;

using the real time session manager:

establishing a plurality of real time sessions with a plurality of user computers to enable the plurality of user computers to access corresponding data of the plurality of practice tests and execute a corresponding practice test from the plurality of practice tests from the plurality of user computers; and for each particular real time session, of the plurality of real time sessions:

as the particular real time session is in progress and the corresponding practice test is executed, collecting particular test results received from a particular user computer;

transmitting the particular test results to the one or more user devices.

12. The computer-implemented method of claim 11, further comprising:

for each particular real time session, of the plurality of real time sessions:

in response to determining that the particular real time session has ended, analyzing the particular test results, using the AI-based analyzer executing the machine learning model, to determine one or more particular quality metrics for the particular test results;

transmitting the one or more particular quality metrics to the one or more user devices;

wherein transmitting the one or more particular quality metrics to the one or more user devices causes a particular user device, from the one or more user devices, to generate a particular graphical representation of the one or more particular quality metrics and display the particular graphical representation on a particular display device of the user device;

wherein displaying the particular graphical representation on the particular display device of the user device comprises providing analytic functionalities for analyzing the one or more particular quality metrics;

wherein displaying the particular graphical representation on the particular display device of the user device comprises generating a particular graphical user interface dashboard that graphically depicts the acumen and comprehension level of the user who performed the corresponding practice test;

wherein the particular graphical user interface dashboard displays one or more of: icons, text boxes, graphs, data arrangements or tables capturing the one or more particular quality metrics.

13. The computer-implemented method of claim 8, further comprising:

as the real time session is in progress and the practice test is executed, generating, using the practice test manager, a visual overlay to be displayed over a depiction of data of the practice test;

wherein the visual overlay comprises prompts, graphs, and information that point out trends and relevant data points, and that assist in executing the practice test.

14. The computer-implemented method of claim 8, further comprising:

as the real time session is in progress and the practice test is executed, collecting sensor signals from one or more sensors communicatively coupled to the user computer, and including the sensor signals in the test results.

15. A non-transitory computer-readable storage medium storing one or more computer instructions which, when executed by one or more processors, cause the one or more processors to perform:

receiving, from a request manager, a request for performing a practice test;

retrieving, using a practice test manager, data for the practice test;

using a real time session manager:
establishing a real time session with a user computer to enable the user computer to access the data and execute the practice test; and
as the real time session is in progress and the practice test is executed, collecting test results received from the user computer;
in response to determining that the real time session has ended:
analyzing the test results, using an AI-based analyzer executing a machine learning model, to determine one or more quality metrics for the test results;
transmitting the one or more quality metrics for the test results to one or more user devices to cause the one or more user devices to display the one or more quality metrics.

16. The non-transitory computer-readable storage medium of claim 15, storing additional instructions for:

wherein transmitting the one or more quality metrics to the one or more user devices causes a user device, from the one or more user devices, to generate a graphical representation of the one or more quality metrics and display the graphical representation on a display device of the user device.

17. The non-transitory computer-readable storage medium of claim 16, wherein displaying the graphical representation on the display device of the user device comprises providing analytic functionalities for analyzing the one or more quality metrics and determining an acumen and comprehension level of a user who performed the practice test and that is determined based on the one or more quality metrics;

wherein displaying the graphical representation on the display device of the user device comprises generating a graphical user interface dashboard that graphically depicts the acumen and comprehension level of the user who performed the practice test;

wherein the graphical user interface dashboard displays one or more of: icons, text boxes, graphs, data arrangements or tables capturing the one or more quality metrics.

18. The non-transitory computer-readable storage medium of claim 17, storing additional instructions for:

receiving, using the request manager, a plurality of requests for performing a plurality of practice tests;

retrieving, using the practice test manager, a plurality of data sets for the plurality of practice tests;

using the real time session manager:
establishing a plurality of real time sessions with a plurality of user computers to enable the plurality of user computers to access corresponding data of the plurality of practice tests and execute a corresponding practice test from the plurality of practice tests from the plurality of user computers; and
for each particular real time session, of the plurality of real time sessions:
as the particular real time session is in progress and the corresponding practice test is executed, collecting particular test results received from a particular user computer;
transmitting the particular test results to the one or more user devices.

19. The non-transitory computer-readable storage medium of claim 18, storing additional instructions for:

for each particular real time session, of the plurality of real time sessions:
in response to determining that the particular real time session has ended, analyzing the particular test results, using the AI-based analyzer executing the machine learning model, to determine one or more particular quality metrics for the particular test results;
transmitting the one or more particular quality metrics to the one or more user devices;
wherein transmitting the one or more particular quality metrics to the one or more user devices causes a particular user device, from the one or more user devices, to generate a particular graphical representation of the one or more particular quality metrics and display the particular graphical representation on a particular display device of the user device;
wherein displaying the particular graphical representation on the particular display device of the user device comprises providing analytic functionalities for analyzing the one or more particular quality metrics;
wherein displaying the particular graphical representation on the particular display device of the user device comprises generating a particular graphical user interface dashboard that graphically depicts the acumen and comprehension level of the user who performed the corresponding practice test;
wherein the particular graphical user interface dashboard displays one or more of: icons, text boxes, graphs, data arrangements or tables capturing the one or more particular quality metrics.

20. The non-transitory computer-readable storage medium of claim 15, storing additional instructions for:
- as the real time session is in progress and the practice test is executed, generating, using the practice test manager, a visual overlay to be displayed over a depiction of data of the practice test;
- wherein the visual overlay comprises prompts, graphs, and information that point out trends and relevant data points, and that assist in executing the practice test.

* * * * *